Sept. 5, 1967  R. C. SEIDEL  3,339,253
DEFLECTION COMPENSATING DEVICE FOR A MACHINE TOOL SPINDLE
Filed Dec. 10, 1965  2 Sheets-Sheet 1

INVENTOR.
ROBERT C. SEIDEL
BY
*Hoffmann and Yount*
ATTORNEYS

INVENTOR.
ROBERT C. SEIDEL

United States Patent Office 3,339,253
Patented Sept. 5, 1967

3,339,253
DEFLECTION COMPENSATING DEVICE FOR A
MACHINE TOOL SPINDLE
Robert C. Seidel, Port Clinton, Ohio, assignor to The
Warner & Swasey Company, Cleveland, Ohio, a corporation of Ohio
Filed Dec. 10, 1965, Ser. No. 512,846
10 Claims. (Cl. 29—38)

The present invention relates to a machine tool and more particularly to a machine tool having relatively movable tool and work supporting members which carry a tool and a workpiece, respectively, and are operable to effect cutting of the workpiece.

In certain machine tools of the type referred to, the tool supporting member extends generally horizontally and has a tool supporting portion located on a cantilevered portion thereof. In such a machine tool, the tool supporting member is horizontally movable relative to the workpiece with the length of the cantilevered portion changing as the tool supporting member is so moved. It will be appreciated that tooling supported on the tool support member will cause a vertical deflection of the tool support member and that the amount of vertical deflection will change as the length of the cantilevered portion changes during movement of the tool support member. As a result of this change in deflection as the tool supporting member moves, a surface on the workpiece cut by the tool is tapered slightly in a vertical plane.

Accordingly, an important object of the present invention is the provision of a new and improved machine tool including relatively movable tool and workpiece supporting members one of which is an elongated member which is movable longitudinally and horizontally relative to the other and which is constructed and arranged so that vertical taper of surfaces cut on the workpiece by the tool is minimized.

Another object of the present invention is the provision of a new and improved machine tool including a member having a tool support portion and a member having a work support portion with one member movable horizontally relative to the other member to effect a machining operation and wherein the one member is supported in such a manner that it deflects differently under different loads and which is constructed and arranged so that the horizontally movable member is adjustable to change the distance between the work support portion and the tool support portion to compensate for deflection of the movable member due to varying loads supported thereon.

Another object of the present invention is the provision of a new and improved machine tool including a tool supporting member and a work supporting member and wherein one of the members is longitudinally movable relative to the other member and includes a cantilevered end portion, and which is constructed and arranged so that the cantilevered portion of the movable member may be moved vertically relative to the other member to change the path followed by the cantilevered portion as it moves longitudinally relative to the other member.

Another object of the present invention is the provision of a new and improved machine tool having a workpiece supporting spindle member operable to rotate the workpiece about a substantially horizontal axis and a tool supporting member spaced vertically from the spindle member and including a cantilevered turret portion and which is horizontally movable and rotatable to predetermined index positions and which is supported for longitudinal and rotary movement by a pair of bearing members, one of the bearing members being adjustable to change the distance between the turret portion and the axis of the spindle member to compensate for deflection caused by loading of the turret portion.

Another object of the present invention is the provision of a new and improved machine tool, as noted in the next preceding paragraph wherein the one bearing member includes a cylindrical bore for receiving the tool supporting member and an external cylindrical surface received in a bore in a support frame and which is eccentric with respect to the cylindrical bore and rotatable in the support frame to change the distance between the cantilevered support portion and the support portion on the other of the members to improve the accuracy of the machine.

Another object of the present invention is the provision of a new and improved machine tool of the type described in the next preceding object wherein the bearing is rotatable between predetermined limits.

Further objects and advantages of the present invention will be apparent to those skilled in the art to which it relates from the following detailed description of the preferred embodiment thereof made with reference to the accompanying drawings forming a part of the specification and in which.

Figure 1:
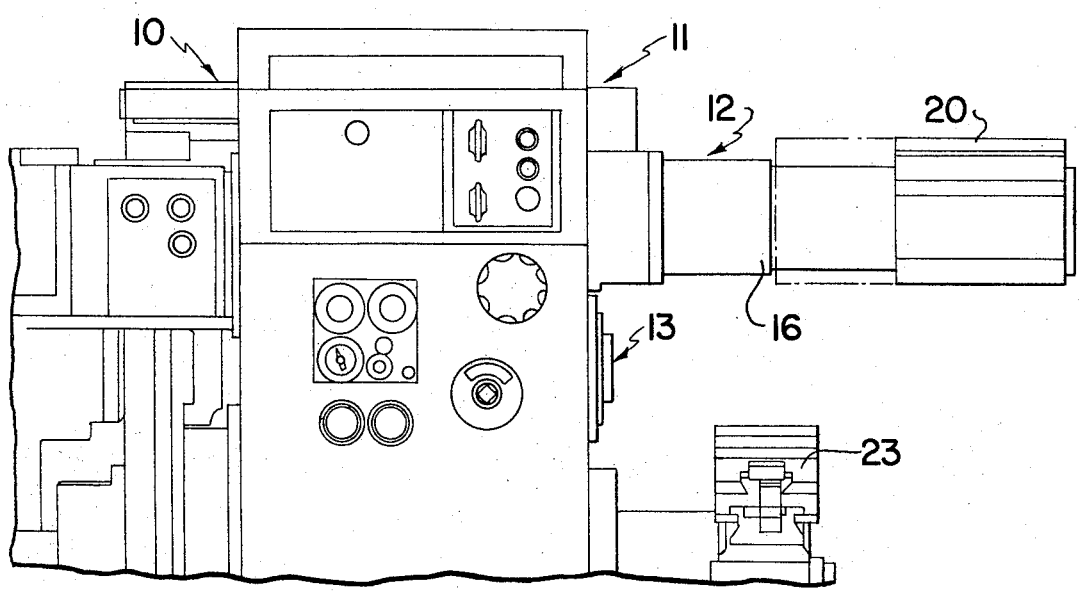
FIG. 1 is a fragmentary elevational view of a machine tool embodying the present invention.
Figure 2:
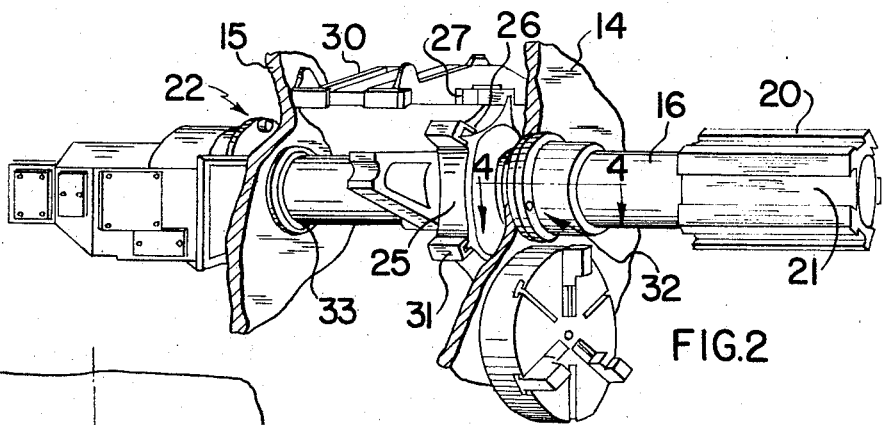
FIG. 2 is a fragmentary perspective view of a portion of the machine tool of FIG. 1.
Figure 3:
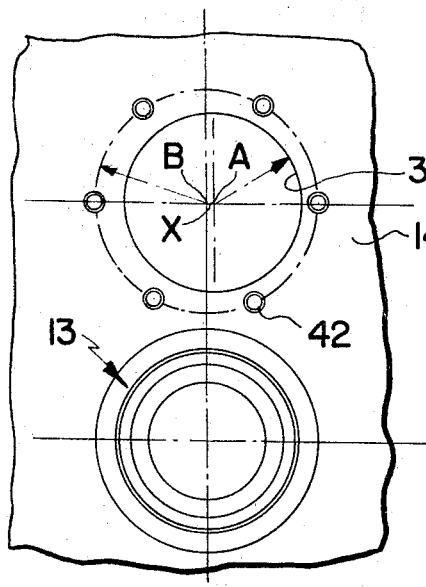
FIG. 3 is a fragmentary elevational view of a portion of a machine tool shown in FIG. 2.
Figure 4:
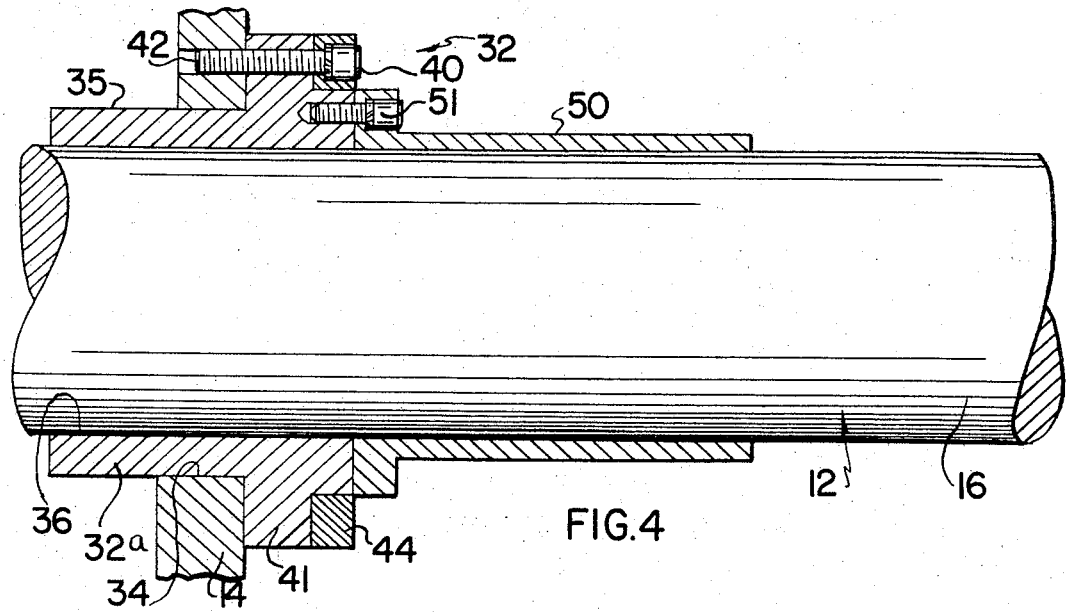
FIG. 4 is a fragmentary sectional view of the machine tool shown in FIG. 2 taken approximately along the section line 4—4 of FIG. 2.

The present invention provides an improved machine tool of the type which includes tool and work supporting members. Generally, in this type of machine tool, the work is rotated relative to the tool supporting member and the tool supporting member is axially movable relative to the work in a direction which is generally parallel to the axis of rotation of the work. Tools connected to the tool supporting member will engage the work during the movement of the tool supporting member and cut the work in a well known manner. The weight of the tooling on the tool supporting member deflects the tool supporting member and causes surfaces cut on the work to be tapered in a vertical plane. In accordance with the present invention, this vertical taper is minimized.

As representing the preferred embodiment of the present invention, the drawings illustrate a machine tool 10. The machine tool 10 is of the type shown in U.S. Patent No. 2,644,222 and includes a head stock portion 11 which supports a tool supporting bar 12 and a rotatable work supporting spindle 13. The spindle member 13 is adapted to support a workpiece for rotation with the spindle member. The tool bar 12 is an elongated member which extends horizontally from the head stock 11 in a direction generally parallel to the axis of rotation of the spindle member 13. The tool bar 12 is supported for rotational and axial movement relative to the spindle member by frame members 14 and 15 which form a part of the head stock portion 11, and includes a cantilevered end portion 16 which extends from the frame member 14 over the axis of the spindle member as viewed in the drawings.

The cantilevered end portion 16 of the tool bar 12 includes a turret 20 adjacent its end. The turret is adapted to support a plurality of tools which are engageable with a workpiece supported by the spindle and which perform various machining operations on the workpiece as the tool bar is moved axially relative to the workpiece by a feed mechanism. The turret 20 includes a plurality of longitudinally extending grooves 21 which have oppositely beveled side surfaces thereon and which form a dovetail connection with similarly shaped projections on tool supporting members carried by the turret. The tool supporting members vary in size and shape depending on the type of machining operations which they are adapted to perform. The tool bar 12 may be rotated to bring the various tools supported by the turret 20 into position for engagement with the workpiece by an indexing mechanism generally designated 22 in the drawings. Additional machining operations may be performed on the workpiece by tools held on a cross slide 23 located adjacent the spindle member. The machine tool 10 also includes means for imparting axial movement to the tool bar 12. The construction of this means is conventional and for this reason is not illustrated in the drawings nor will it be described.

As the tool bar 12 is moved axially relative to the spindle member, it is held against rotational movement by a spider member 25, rigidly secured to the tool bar and which engages a bridge member 30 fixed in the head stock 11. The spider 25 includes a plurality of projections 26 which are separately engageable with a rail 27 formed in the bridge member 30. The projections 26 include blocks 31 connected to the ends thereof and which are engageable with sides of the rail 27 so that the position of the tool members relative to the workpiece may be accurately determined and maintained during axial movement of the tool bar.

In machine tools of the type described herein it will be appreciated that the cantilevered portion 16 of the tool bar is subjected to bending moments which correspond to the weight of the tooling supported by the turret portion, and that the bending moment will change when the tooling supported by the turret portion is changed. Those persons skilled in the art to which this invention relates will further understand that the bending moment applied to the cantilevered tool bar will cause a deflection of the bar which is related to the weight of the tooling supported thereon. Further the weight of the tooling supported by the tool bar will vary from setup to setup depending on the particular machining required. While deflection of a tool bar supported in a manner described herein may be reduced by increasing the rigidity of the tool bar, a limited amount of deflection of the tool bar is unavoidable, and as a tool in engagement with a workpiece is moved longitudinally with the tool bar, a slightly tapered surface will be cut on the workpiece.

In accordance with the present invention the longitudinally movable tool bar is adjustable to change the distance between the axis of rotation of the spindle member and the tool supporting turret in order to compensate for differing amounts of deflection of the tool bar resulting from varying loads which are supported thereon.

In the illustrated embodiment, the tool bar 12 is supported for rotational and longitudinal movement by support means positioned in the frame members 14 and 15, respectively. The support means include a support bearing member 33 which is fixedly secured in the frame member 15 and a support means 32 supported by the frame member 14. The support means 32 includes a support bearing member 32a located in a bore 34 in the frame 14. The bore 34 is spaced vertically from the axis of rotation of the spindle member and the center of the bore is laterally offset from a vertical line through the center line of the spindle member. A wiper member 50 is secured to the right end of the support bearing member 32a by screws 51 and encircles the tool bar 12 which rotates and moves axially relative thereto. The wiper member 50 functions to prevent chips, etc., from being carried with the tool bar 12 upon axial movement thereof.

The support bearing member 32a is a generally cylindrical flanged member including an outer cylindrical surface 35 and an inner bore 36. The support member 32a is detachably connected to the frame member 14 so that the outer cylindrical surface 35 is snugly engaged and supported in the bore 34 formed in the frame member 14. The inner bore 36 surrounds the tool bar 12 and is eccentric with respect to the outer cylindrical surface 35. The center of the surface 35 is designated A in FIG. 6, while the center of the bore 36 is designated B in FIG. 6. These centers are offset by a distance X as viewed in FIG. 6. The center of the tool bar 12 and the center B of the bore 36 correspond.

The bearing member 32a is supported and secured to the frame 14 for limited rotational movement relative to the frame member 14 in the bore 34. It will be apparent that upon rotation of the support member 32a in the bore 34 the center B of the inner bore 36 rotates about the center A of the outer cylindrical surface 35. Rotation of the center B of the inner bore 36 about the center A of the outer cylindrical surface 35 causes a corresponding movement of the tool bar 12 which is supported in the inner bore 36. The movement of the tool bar 12 is accompanied by a limited vertical movement of the turret portion 20 relative to the axis of rotation of the spindle. Due to the relationship between the aforementioned eccentric surfaces on the support member 32a, the turret portion 20 will be moved slightly in a horizontal direction relative to the axis of rotation of the spindle as it is moved vertically. This horizontal movement of the turret is in a direction which is transverse to its axis of rotation, but the horizontal movement occasioned by rotation of the support member 32a is small in comparison with the vertical movement. Horizontal movement of the turret will result in a slight taper, in a horizonal plane, of surfaces cut on the work but this horizontal taper may be minimized by adjusting the position of the bridge member 30, if desired.

In the illustrated and preferred embodiment, the support member 32a is detachably connected to the frame member 14 by a plurality of screws 40. The screws 40 extend through a flange 41 on the support member and into tapped holes 42 formed in the frame member. The flange 41 is concentric with the inner bore 36 of the support member and includes a plurality of arcuate slots 43 through which the screws 40 extend. The screws 40 also extend through a clamp ring 44 which is carried by the support member. When the screws are tightened, the clamp ring 44 tightly engages the support member and clamps the support member against movement relative to the frame 14.

When the tool loading on the turret 20 is such that a machined surface on the work will be vertically tapered by an amount which is deemed excessive, the screws 40 are loosened and the support member 32a is rotated in the frame member to raise or lower the turret 20 relative to the spindle axis as desired. Rotation of the support member in the frame is, of course, limited by engagement of the screws 40 with ends 45 or 46 of the arcuate slots 43 formed in the flange 41. When the support member has been rotated to move the turret 20 to a desired position relative to the axis of rotation of the spindle, the screws 40 are tightened to hold the support member against further movement.

It should be appreciated that the adjustment provided by the support means 32 is effective to change the elevation of the turret end of the bar relative to the spindle axis. This change in elevation changes the path followed by a tool carried by the turret 20 to reduce the vertical taper on surfaces formed on the work by the tool. A slight misalignment of the tool bar 12 in the support means 32 and 33 may occur as the support member 32a is moved to adjust the tool bar. This misalignment occurs because the support means 33 is stationary in the frame member 15, but the movement of the support member 32a is quite limited so that the resulting misalignment of the tool bar in the supports causes no detrimental binding of the tool bar therein.

Figures 5, 6:
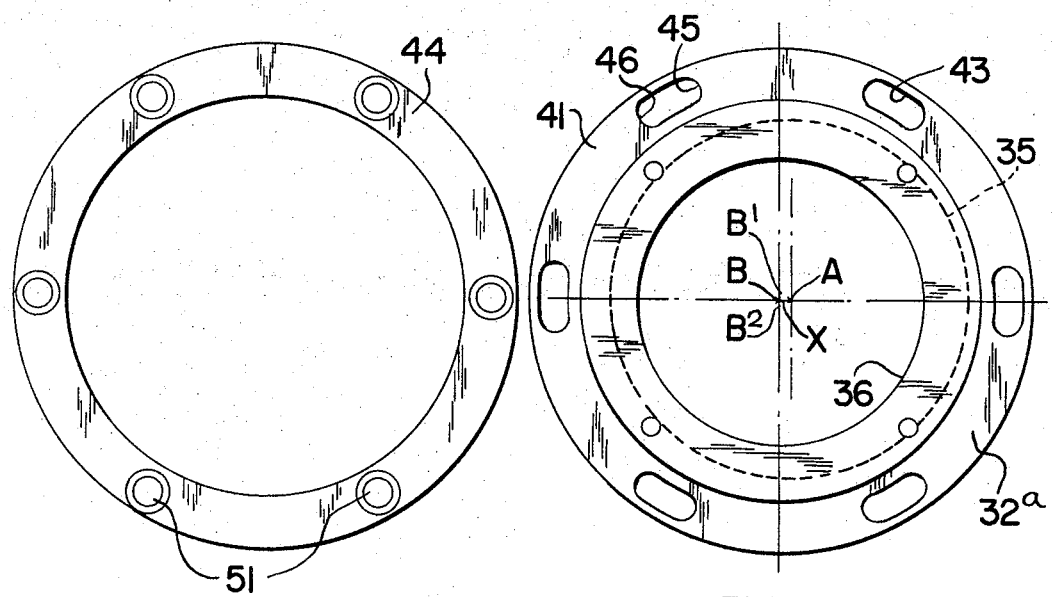
FIG. 5 is an elevational view of a portion of the machine shown in FIG. 2.
FIG. 6 is an elevational view of another portion of the machine tool shown in FIG. 2.

The operation of the support means 32 should be apparent from the foregoing description. The support member 32a is detachably secured to the frame member 14 with the tool bar 12 supported in the inner bore 36 of the support member 32a. The support member 32a is rotatably movable relative to the frame member 14 and carries the tool bar therewith. When the support member 32a is in its normal, or first position, the centers A and B of cylindrical surface 35 and bore 36, respectively, lie in a horizontal plane. This first position is shown in FIG. 6. In this position, the center line of the tool bar lies on the center B of the bore 36 so that the centers of the tool bar and the bore 36 are offset a distance X from the center of the cylindrical surface 35. In its first position, the support bearing member 32a supports the tool bar 12 with its center on a vertical line passing through the axis of rotation of the spindle member 13.

When the tool bar 12 is to be subjected to large downwardly acting bending moments, for example, as a result of supporting a large tool loading, the screws 40 are loosened and the support member 32a is rotated in a clockwise direction toward a second position $B_1$, as viewed in FIG. 6. Rotation of the support member 32a causes the center B of the tool bar and bore 36 to move upwardly on an arc about the center A of the outer surface 35. This upward movement will of course cause the distance between the axis of rotation of the spindle member and the turret 20 to be increased slightly to compensate for deflection of the tool bar. When the position of the turret 20 is such that deflection of the tool bar is adequately compensated for, the screws 40 are tightened to secure the bearing member in its adjusted position.

When it becomes necessary or desirable to decrease the distance between the turret 20 and the axis of rotation of the spindle member 13, the screws 40 are loosened and the support bearing 32a is rotated in a counterclockwise direction toward a third position $B_2$, as viewed in FIG. 6. This movement of the support bearing member, of course, causes the distance between the turret and the spindle axis to decrease. When the turret is suitably positioned relative to the spindle axis, the screws 40 are tightened to secure the support bearing in position. In the preferred embodiment, the support bearing member 32a can be moved through a total angle of approximately 8 degrees. The total vertical shift of the center B, namely the vertical distance between points $B_1$ and $B_2$ as shown in the drawings, is approximately .01 inch. Rotation of the support bearing member 32a may be effected by hand or with the use of a wrench, depending on the fit between the cylindrical surface 35 and the bore 34 in the frame member 14.

It can now be seen that an improved machine tool has been provided which includes means for adjusting a cantilevered work or tool supporting member relative to the axis of rotation of a rotatable spindle member to provide machined surfaces on the work which have a minimum amount of taper in a vertical plane.

While the preferred embodiment of the present invention has been shown and described in considerable detail, it should be apparent that certain changes, modifications, and adaptations may be made therein, and it is intended to cover all such changes, modifications and adaptations which are covered by the appended claims.

Having described my invention, I claim:

1. A machine tool comprising a first member having a tool support portion, a second member having a work support portion, one of said members being elongated with its support portion located at one end thereof, and means supporting said one member with said support portion being cantilevered and with said one member deflecting upon loading of said support portion thereof, said means including a support member having an opening therein through which said one member extends and a rotatable member in said opening, said rotatable member having a first cylindrical surface engageable with a second cylindrical surface defining said opening in said support member, said rotatable member including a third cylindrical surface encircling and engaging said one member of said machine tool, said first and third cylindrical surfaces being eccentric and rotatable relative to said one member and said support member to move said one member and change the distance between said support portion of said one member and the support portion of said other member to compensate for deflection of said one member.

2. A machine tool of the type defined by claim 1 further including means detachably securing said member to said support member and means for limiting the extent of rotation of said rotatable member.

3. A machine tool comprising an elongated substantially horizontally extending tool bar having a cantilevered tool supporting end portion which deflects vertically under load, a work supporting rotatable spindle member spaced vertically from said tool bar, and means for supporting said tool bar for rotation about its axis and for axial movement relative to said spindle member, said means including cooperating relatively movable parts operable upon relative movement therebetween to compensate for deflection of said cantilevered end portion by moving said end portion of said tool bar vertically relative to the axis of rotation of said spindle member, and said parts having cooperating surfaces operable to effect said movement upon relative movement therebetween.

4. A machine tool of the type defined in claim 3 wherein one of said parts is rotatable and includes a first cylindrical surface in surrounding engagement with said tool bar and a second cylindrical surface engaging a second of said parts, said surfaces being eccentric and operable to move said end portion of said tool bar vertically relative to said spindle member on rotation of said one part.

5. The machine tool of claim 4 wherein said one part is detachably secured to said second part and including fastening members for securing said one part in a predetermined position relative to said second part.

6. The machine tool of claim 4 including means associated with said parts for limiting rotation of said one part to limit the movement thereof.

7. The machine tool of claim 3 wherein said support means includes a first bearing member, and one of said parts comprises a second bearing member spaced intermediate said first bearing member and said tool supporting end portion, a second one of said parts comprises a member having a bore in which said second bearing member is supported for rotation relative thereto, said bearing members supporting said tool bar for rotation and axial movement relative to said spindle member, and said second bearing member having an eccentric bore therethrough through which the tool bar extends.

8. The machine tool of claim 7 wherein the axis of rotation of said tool bar is disposed on a vertical line passing through said spindle axis when said second bearing member is in a first position, said second bearing member being rotatable toward and away from a second position to move said tool bar and change the vertical distance between the cantilevered end of said tool bar and said spindle axis.

9. The machine tool of claim 8 wherein the center of said bore in said second bearing member is spaced laterally from the center of said bore in said second one of said parts when said second bearing member is in said first position, and the center line of said bore in said second bearing member lies on the axis of said tool bar.

10. A machine tool comprising an elongated tool bar having a tool supporting portion, a work supporting rotatable spindle member spaced from said tool bar, means for supporting said tool bar for rotation about its axis which lies substantially parallel to the axis of rotation of said spindle member including first and second spaced bearing members having bores receiving said tool bar and supporting said tool bar for longitudinal movement and rotational movement relative thereto, the center of said bores in said bearing members lying on the axis of said tool bar, a support member having a bore therein rotatably and snugly receiving a cylindrical surface of one of said bearing members, said bore in said support member and said cylindrical surface having a substantially common center offset from the center of said bore in one of said bearing members, and means for securing said one of said bearing members against movement in said bore in said support member and releasable to permit rotation therein.

References Cited

UNITED STATES PATENTS 3,211,025  10/1965  Molta _____ 77—3

RICHARD H. EANES, JR., *Primary Examiner.*